Patented Aug. 30, 1938

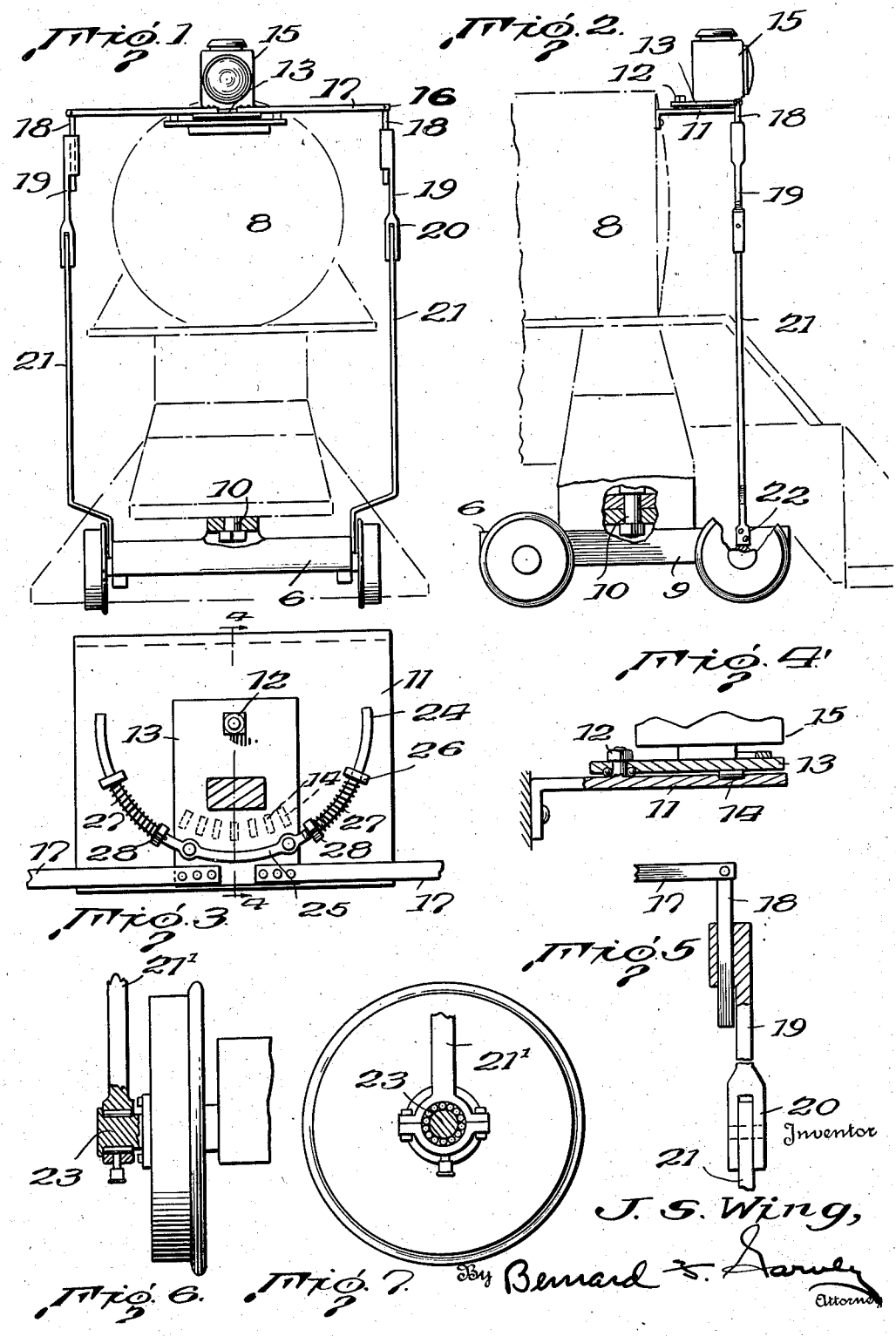

2,128,765

UNITED STATES PATENT OFFICE 2,128,765

DIRIGIBLE LOCOMOTIVE HEADLIGHT

Joseph S. Wing, Springville, Utah

Application August 22, 1936, Serial No. 97,464

1 Claim. (Cl. 240—62.1)

In use of dirigible headlights for locomotives it has been customary to employ center connections which have been attended by lost motion in the joints, especially by reason of wear on the pivot pin, thus lessening the effectiveness of the dirigible mechanism. Furthermore, it has been found necessary in the use of center connection dirigible headlights to use an extra set of pony wheels because of the inaccessibility of the pivot pin beneath the locomotive. In addition the center connection lies in the path of movement of the locomotive clean out doors.

It is the object of this invention to provide dirigible headlight mechanism of simple construction which may be attached to standard locomotives and operated by movement of the pony wheel truck, motion being transmitted from the truck to the light by suitable means located on the opposite side of the locomotive, thereby obtaining a direct and positive movement of the headlight corresponding to the arc of movement of the pony wheel truck.

It is further within the contemplation of my invention to include light centering means in the dirigible mechanism to normally hold the light centered as well as return the light to a center position in the event of failure of the dirigible mechanism.

In the accompanying drawing:

Fig. 1 is a front elevational view of dirigible mechanism constructed in accordance with the present invention illustrating its application.

Fig. 2 is a side elevational view thereof.

Fig. 3 is a fragmentary top plan view of the dirigible mechanism per se.

Fig. 4 is a detail fragmentary sectional view taken on the line 4—4 of Fig. 3 looking in the direction of the arrows and showing to advantage the manner of mounting the headlight bracket.

Fig. 5 is a detail fragmentary sectional view of one of the side connections of the dirigible mechanism.

Fig. 6 is a fragmentary sectional side elevational view of a modified form of connection between the dirigible mechanism and the pony truck, and Fig. 7 is a side elevational view thereof.

In the drawing to illustrate the application of this invention, I have shown a portion of a locomotive 8 of standard construction, which includes a pony truck 9, pivotally connected at 10 to a portion of the front of the locomotive frame in a manner well known in the art. The dirigible mechanism includes a headlight supporting shelf 11 fixedly secured at any suitable point on the front or top of the locomotive boiler. The shelf has pivotally mounted thereon, as indicated at 12, a plate 13. Roller bearings 14 are mounted in complemental recesses in the shelf 11 which engage the bottom face of the plate 13. A headlight housing 15 is engaged with the plate 13 in any suitable manner.

In order that the headlight may follow the arc of movement of the pony truck 9, I provide suitable connections between the plate 13 and the truck 9, which connections are generally designated 16. These connections may consist of levers 17, one end of each of which is fixedly secured to the plate 13, the opposite end being pivotally engaged with a link 18. It will be noted, especially upon reference to Fig. 1 of the drawing, that the levers 17 lie in a horizontal plane, while the links 18 depend vertically therefrom. The links 18 are sleeved in the upper ends of bars 19, the lower end of each of the latter being bifurcated, as indicated at 20, the branches of the bifurcation straddling and being pivotally engaged to the upper end of a standard 21. The lower end of the standard, in the form of invention shown in Figures 1 to 5, is fixedly secured, as shown at 22, to the side of the truck frame at the front end of the latter. By this arrangement all vertical and lateral movement of the mechanism is taken care of without stress on any part of the mechanism.

In the form of invention shown in Figures 6 and 7 of the drawing, each of said standards 21' is engaged with a stub shaft 23 secured to the side of one of the pony wheels at the axis of the latter. Suitable anti-friction rollers are interposed between the standard 21' and the stub shaft.

It will be apparent from the above that arcuate movement of the pony truck is positively and directly transmitted to the locomotive headlight, the beam of the headlight being at all times in the path of movement of the pony truck.

To prevent the possibility of the headlight failing to return to a center position in the event of failure of any part of the dirigible mechanism, I provide automatic headlight centering means, generally designated 24. This mechanism may consist of a semi-circular rod 25, secured to the plate 13, the free ends thereof being trained through brackets 26 mounted on the shelf 11. Springs 27 are mounted on the rod 25 between the brackets 26 and nuts 28. The nuts 28 are threaded on the rod 25 and may be adjusted to take up wear in the springs 27 in an apparent manner, the nuts being held from casual movement by cotter pins or the like. By this arrangement the means 24 will cause the headlight to return to a center position regardless of whether it has travelled in a right or left arc with the plate 13.

It is of importance in the present invention that the side connections of the headlight, consisting of the standards 21 and bars 19 be located at a point remote from the front and sides of the locomotive boiler permitting engagement with the front of the pony truck of the locomotive without in any way interfering with the movement of the latter and without possibility of damage to the mechanism.

While I have herein described the preferred forms of this invention, I am aware that various changes may be made therein, especially in the details of construction, within the scope of the claim herewith appended.

What is claimed is:

In a dirigible headlight for locomotives, standards one end of each of which is connected with each side of the locomotive truck and extends upwardly at the side of the latter, bars pivotally engaged with the upper ends of standards, links slidably mounted in the upper ends of said bars and levers one end of each of which is pivotally connected to one of said links and the opposite ends fixedly engaged with the headlight, said standards, bars, links and levers being spaced from and free from engagement with the locomotive.

JOSEPH S. WING.